United States Patent [19]
Beakes et al.

[11] Patent Number: 5,662,317
[45] Date of Patent: Sep. 2, 1997

[54] PALLET SUPPORT ASSEMBLY FOR USE IN MANUFACTURING STATORS

[75] Inventors: John M. Beakes, Fairborn; Danny L. Miller, Union, both of Ohio

[73] Assignee: Globe Products Inc., Huber Heights, Ohio

[21] Appl. No.: 529,495

[22] Filed: Sep. 18, 1995

[51] Int. Cl.$^6$ .................................................. B23Q 3/18
[52] U.S. Cl. ............................ 269/58; 269/55; 269/75; 269/309
[58] Field of Search ............................. 269/309, 75, 73, 269/71, 58, 70, 69

[56] References Cited

U.S. PATENT DOCUMENTS

| | | | |
|---|---|---|---|
| 1,639,441 | 8/1927 | Spahr | 269/75 |
| 3,170,683 | 2/1965 | Seibert | 269/71 |
| 3,638,933 | 2/1972 | Burnette et al. | 269/309 |
| 4,205,834 | 6/1980 | Demath et al. | 269/309 |
| 4,553,321 | 11/1985 | Zihlmann et al. | 29/598 |
| 4,612,702 | 9/1986 | Wheeler | 29/596 |
| 4,682,766 | 7/1987 | Barkley | 269/71 |
| 4,713,883 | 12/1987 | Santandrea et al. | 29/596 |
| 4,965,924 | 10/1990 | Santandrea et al. | 29/736 |
| 4,991,631 | 2/1991 | Eminger et al. | 140/140 |
| 5,348,142 | 9/1994 | Nishimura et al. | 198/803.01 |
| 5,370,378 | 12/1994 | Weber et al. | 269/309 |

OTHER PUBLICATIONS

Front & rear covers with pp. 5B, 6, 7, 9, 10, 11, 12 and 10B of catalog published by Enco Manufacturing Company, Chicago, IL 1979.

Front and rear cover and p. 40 of brochure titled "The Modular Transfer System TS2" published in this country by Robert Bosch GmbH, Stuttgart, Germany at least as early as 1987.

Primary Examiner—Timothy V. Eley
Assistant Examiner—Lee Wilson
Attorney, Agent, or Firm—Roger S. Dybvig; John J. Cheek

[57] ABSTRACT

A stator support assembly for use during the manufacture of electric motor stator assemblies includes a pallet, a rotatable stator support nest mounted on the pallet, and a lock arrangement that resists rotation of the nest from plural, locked, rotary orientations. The nest has generally horizontal, upwardly-facing, stator core supporting surfaces and generally vertical stator core confining wall portions. Accordingly, a stator assembly being manufactured is supported in a substantially fixed position or orientation as required when a stator assembly is being transferred from one workstation to the next but can be manually rotated from one locked position to the next for the convenience of a human operator when manual operations on the stator assembly are performed. Lock arrangements that may be used comprise recesses and one or more cooperating spring-biased detents or, alternatively, holes and a spring-biased shot pin.

15 Claims, 3 Drawing Sheets

PALLET SUPPORT ASSEMBLY FOR USE IN MANUFACTURING STATORS

FIELD OF THE INVENTION

This invention relates to a pallet support assembly for use in manufacturing stators and particularly for conveying partly constructed electric motor stator assemblies during manufacture.

BACKGROUND OF THE INVENTION

During manufacture of electric motor stators having cores made from a stack of laminations, partially manufactured stator assemblies may be supported on pallet support assemblies including a support pallet conveyed by a conveyor between manufacturing workstations. At one or more of the workstations, a partially manufactured stator assembly is removed from the pallet support assembly for processing by stator handling mechanisms that may include an elevator or a pick and place mechanism, and returned to the same pallet support assembly or to an essentially identical pallet support assembly by the same handling mechanisms. The pallet support assemblies must be capable of transferring the stator assemblies to the workstations in sufficiently precise positions in order to be handled by the transfer mechanisms. Typically, a pallet support assembly comprises a rigid, fixed or adjustably fixed stator supporting fixture mounted on a pallet.

There are occasions when a stator manufacturer would prefer to have a stator pallet support assembly so constructed that one may rotate the stator assembly while the stator remains supported by the pallet support assembly. This occurs when manual operations are required to course stator coil lead wires through tortuous paths from the points at which they extend from the wound stator coils to terminal members on the stator core and additional manual operations are required to connect the coil lead wires to the terminal members.

There is, therefore, need for a stator pallet support assembly which can support a stator assembly during the course of manufacture in a relatively accurate position but which enables a human operator to rotate the stator assembly to reposition the stator assembly while it remains supported by the pallet support assembly.

SUMMARY OF THE INVENTION

Accordingly, an object of this invention is to provide a stator pallet support assembly which can support a stator assembly as it is transferred between workstations during the course of manufacture in a relatively accurate position but which enables a human operator to rotate the stator assembly to reposition the stator assembly as may be useful, for example, when manually connecting stator coil leads to terminal members, without removing the stator assembly from the pallet support assembly.

In accordance with this invention, a stator pallet support assembly for use during the manufacture of electric motor stators includes a rigid pallet, a stator support nest rotatably mounted on the pallet, and a lock arrangement that resists rotation of the nest from plural rotary orientations thereof. The lock arrangement includes a first part on the nest and a second part fixed in relation to the support plate that cooperate to resist rotation of the nest. The nest has generally horizontal, upwardly-facing, stator core supporting surfaces and generally vertical stator core confining wall portions.

Accordingly, a stator assembly being manufactured is supported in a substantially fixed position or orientation as required when a stator assembly is being transferred from one workstation to the next but can be manually rotated from one locked position to the next for the convenience of a human operator when manual operations are performed on the stator assembly.

Examples of lock mechanisms that may be used in the practice of this invention are cooperating recesses and one or more spring-biased detents or, alternatively, cooperating holes and a spring-biased shot pin.

Other objects and advantages of this invention will become apparent from the following drawings and description.

DETAILED DESCRIPTION

Figure 1:
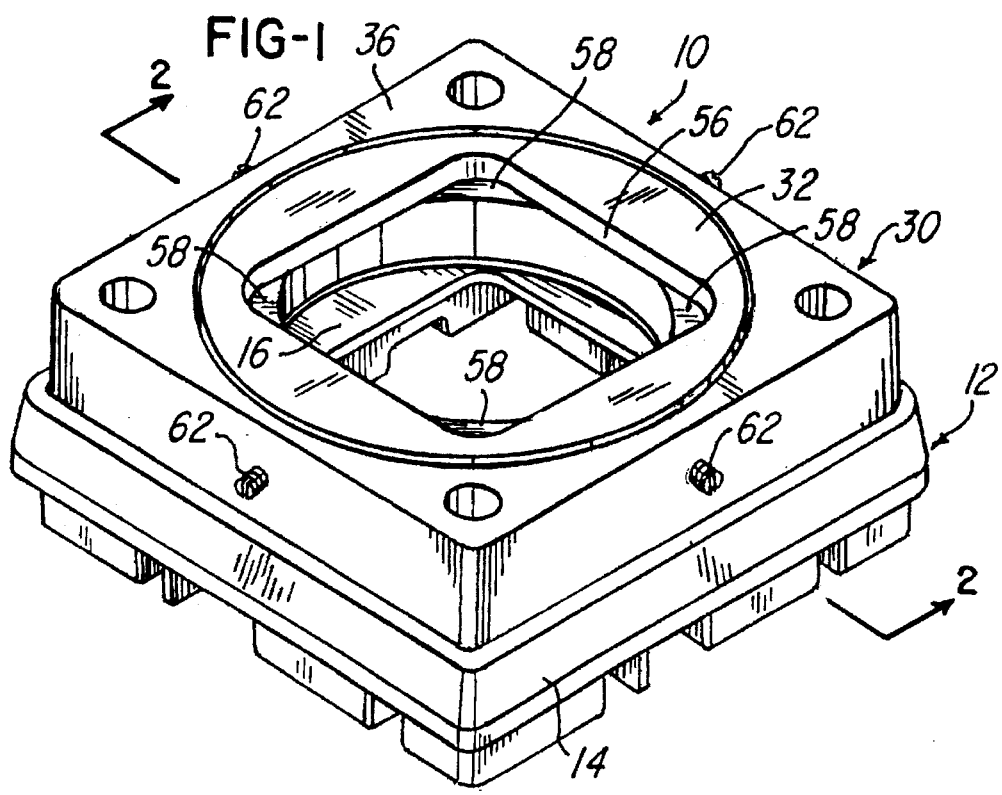
FIG. 1 is a perspective view of a stator assembly support pallet in accordance with this invention.
Figure 2:
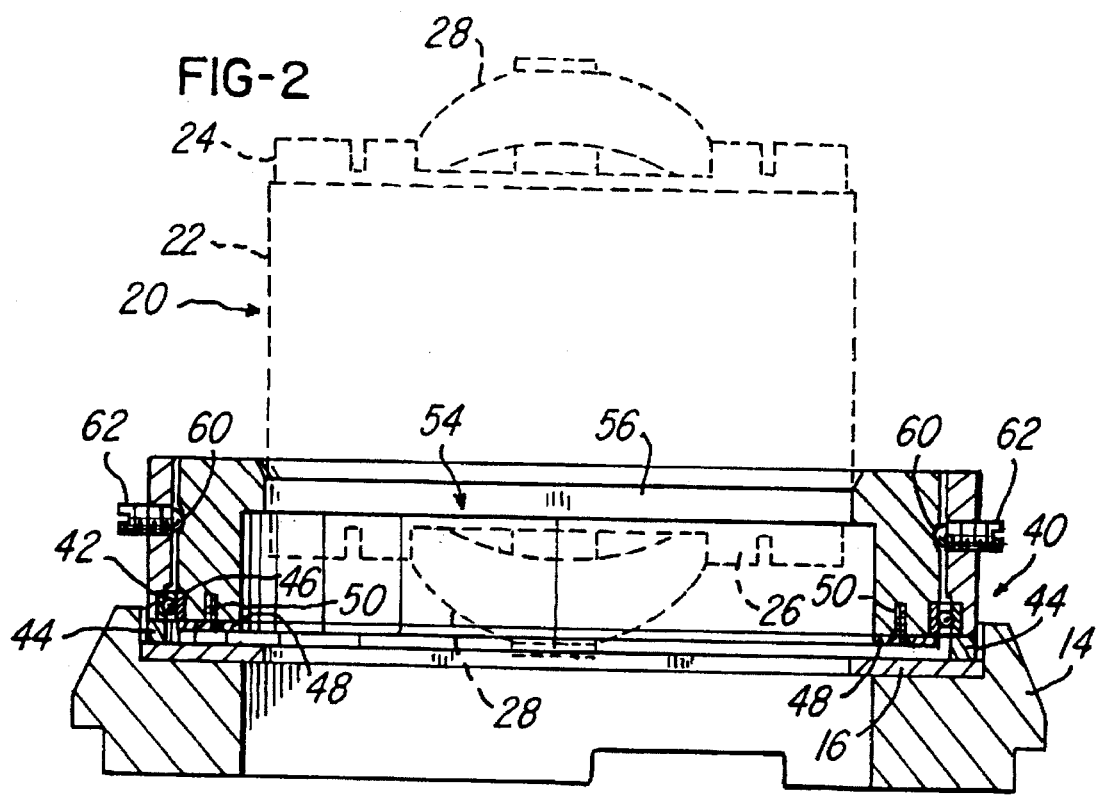
FIG. 2 is a cross-sectional view of the stator support pallet of FIG. 1 taken along line 2—2 and shows, in phantom lines, a partially-manufactured stator assembly supported thereby.
Figure 3:
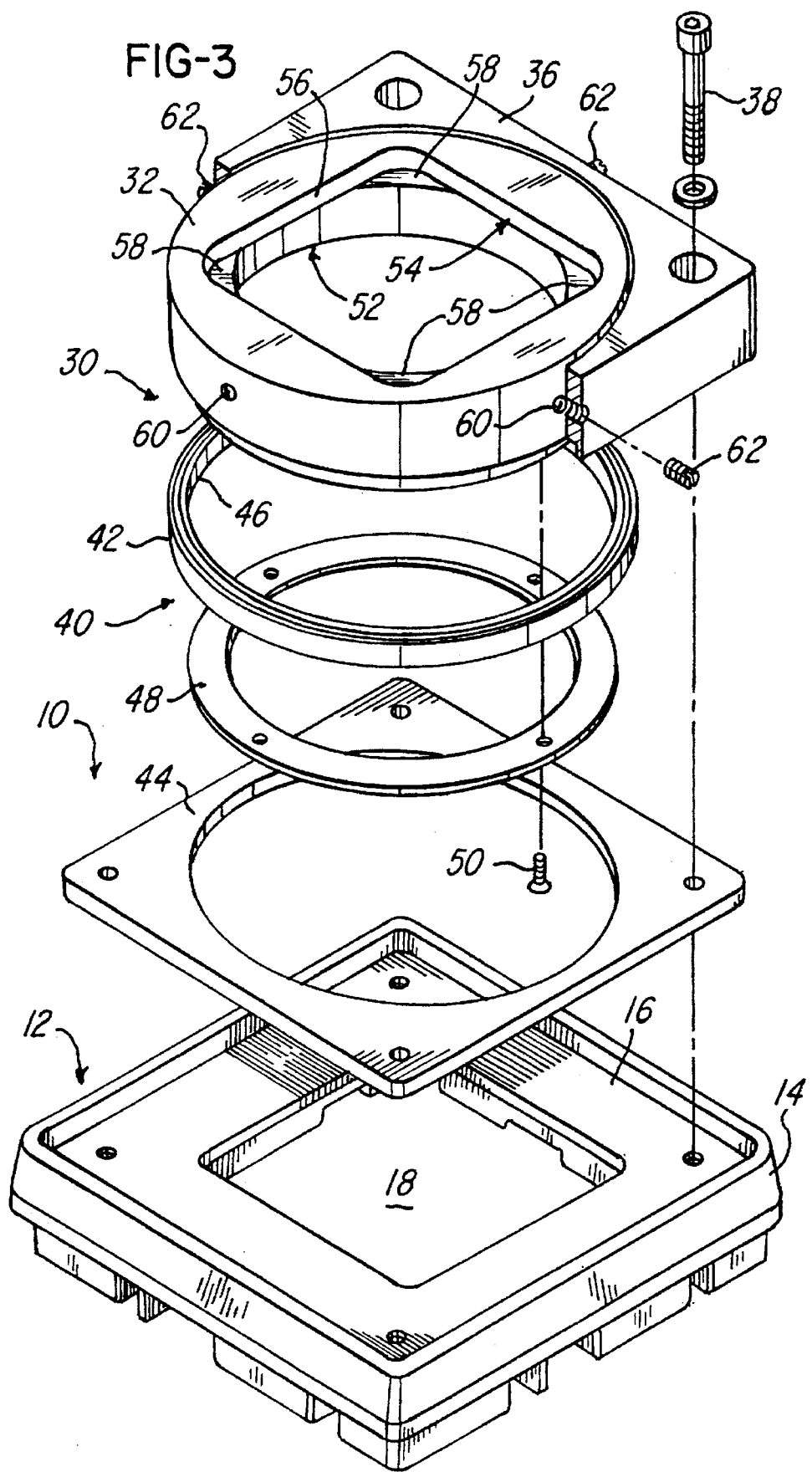
FIG. 3 is a partially-exploded, perspective view, with parts cut away and parts shown in cross section, of the support pallet of FIGS. 1 and 2.

With reference to FIGS. 1 through 3, a stator pallet support assembly, generally designated 10, in accordance with the presently preferred embodiment of this invention includes a rigid pallet, generally designated 12, comprising frame modules 14 affixed to a rectangular pallet support plate 16. The construction of the pallet 12 may be entirely conventional and the construction of the pallet 12, by itself, is not part of this invention. The pallet 12 may be of the type identified as WT2 which are commercially available from Robert Bosch GmbH of Stuttgart, Germany.

As is common in the art of manufacturing stators for electric motors, the pallet support plate 16 is provided with a central aperture 18 to provide access from beneath the pallet 12 to a stator assembly, generally designated 20, loaded on the pallet support assembly 10.

With reference to FIG. 2, the stator assembly 20, which is shown by phantom lines, may be of entirely conventional construction and, in this connection, may include a generally rectangular core 22 having rounded corners and made from a stack of laminations, which are not individually illustrated in FIG. 2, end or terminal plates 24 and 26, and wire stator coils 28 (only one of which is shown in FIG. 2). Lead wires (not shown) extending from the coils 28 are connected to terminal members (not shown) on at least one of the terminal plates 24 and 26.

In accordance with this invention, and with reference to FIGS. 1, 2, and 3, the pallet support assembly 10 includes a stator support structure, generally designated 30, which comprises a cylindrical stator support nest 32 rotatably received within a central through bore 34 in a rectangular bearing housing 36 fixedly mounted on the pallet 12 by socket-headed machine screws 38. The stator support nest 32 is mounted for rotation about its vertical center axis relative to the pallet 12 and the bearing housing 36 by a ring-shaped, circular ball bearing, generally designated 40. The ball bearing 40 includes an outer race 42 non-rotatably clamped on the bottom of the bearing housing 36 by an outer race retainer 44 fixedly mounted on the pallet 12 by the screws 38 and further includes an inner race 46 non-rotatably clamped to the nest 32 by an inner race retainer 48 affixed to the nest 32 by countersunk machine screws 50.

The ball bearing 40 must be of a thin, yet sturdy construction in order to fit within the confines of the bearing housing 36 and the stator support nest 32 and be capable of supporting relatively heavy stator assemblies for a useful service life. A bearing suitable for this purpose is available from Keene Corporation, Kaydon Bearing Division, Muskegon, Michigan, and is identified as Type X Kaydon Reali-Slim Ball Bearings. Such a Kaydon bearing identified as bearing number KA050XPO is presently the bearing of choice.

The stator support nest 32 is designed to hold a stator assembly 20 during the course of manufacture in a predetermined position and rotary orientation. Accordingly, the construction of the nest 32 will be largely dictated by the construction of the stator assembly 20 it is to hold. The particular nest 32 illustrated herein has a large, circular central bore or lower cavity 52 opening to the bottom of the nest 32 and a centrally-located, rectangular cut-out or upper cavity 54 opening to the top of the nest 32. The generally vertical surfaces or walls 56 that the define the outer margins of the upper cavity 54 function to confine the stator assembly 20 against translation in any horizontal direction. As can be seen in FIGS. 1 and 2, the corners of the upper cavity 54 extend beyond the margins of the lower cavity 52 to provide upwardly-facing corner supports 58 for the stator assembly 20 upon which the stator 20 rests when the pallet support assembly 10 is moved to and between stator workstations (not shown).

As is evident, the rotatable mounting of the stator support nest 32 enables it to be manually rotated about its vertical centerline. In order to provide stop or "home" positions for a stator assembly 20, a lock mechanism is provided which comprises a first part on the nest and a second part fixed in relation to pallet 10 that cooperate to resist rotation of the nest 32 in selected orientations thereof. In the embodiment illustrated in FIGS. 1, 2 and 3, the lock mechanism comprises four equally-spaced detent recesses 60 in the outer surface of the nest 32 and four equally spaced spring-biased detent elements 62 mounted on the bearing housing 36 in vertical alignment with the recesses 60. The detent elements 62 can comprise readily available spring-biased ball plungers. As is evident, an operator can grasp the stator assembly 20 and rotate it along with the nest 32 form one detented position to the next, which are 90 degrees apart, as may be required to enable the operator to conveniently perform manual operations on the stator assembly 20. It will also be evident that there could be a different number of detent recesses 60, as the manufacturing operations may require. Also, it will be obvious that there may be a greater or lesser number of detent elements 62 than there are detent recesses 60.

Figure 4:
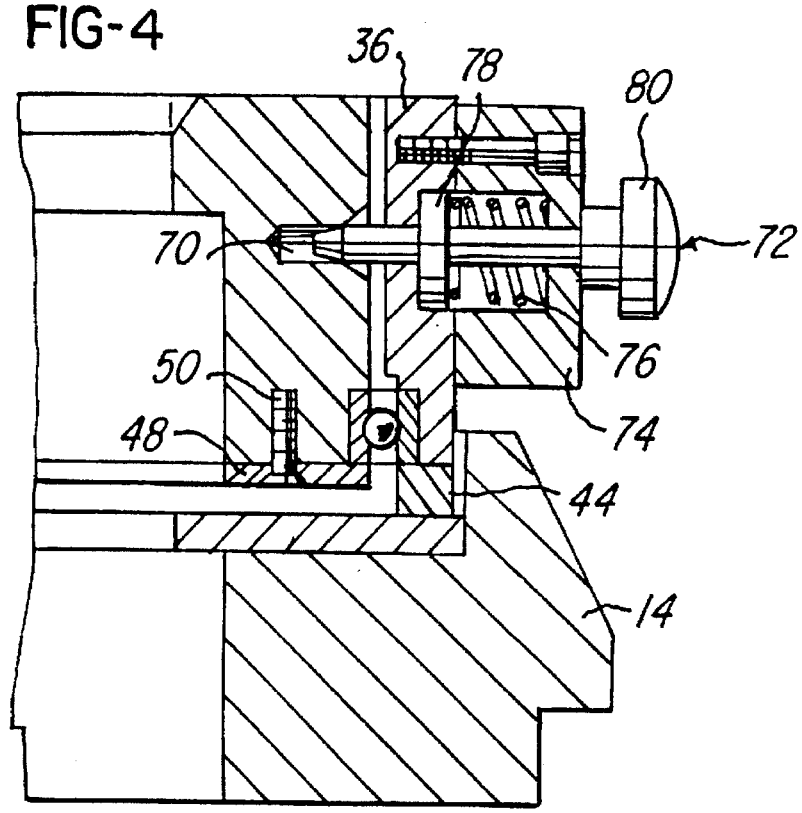
FIG. 4 is an enlarged, fragmentary cross-sectional view of a portion of a modified stator support pallet in accordance with this invention.
Figure 5:
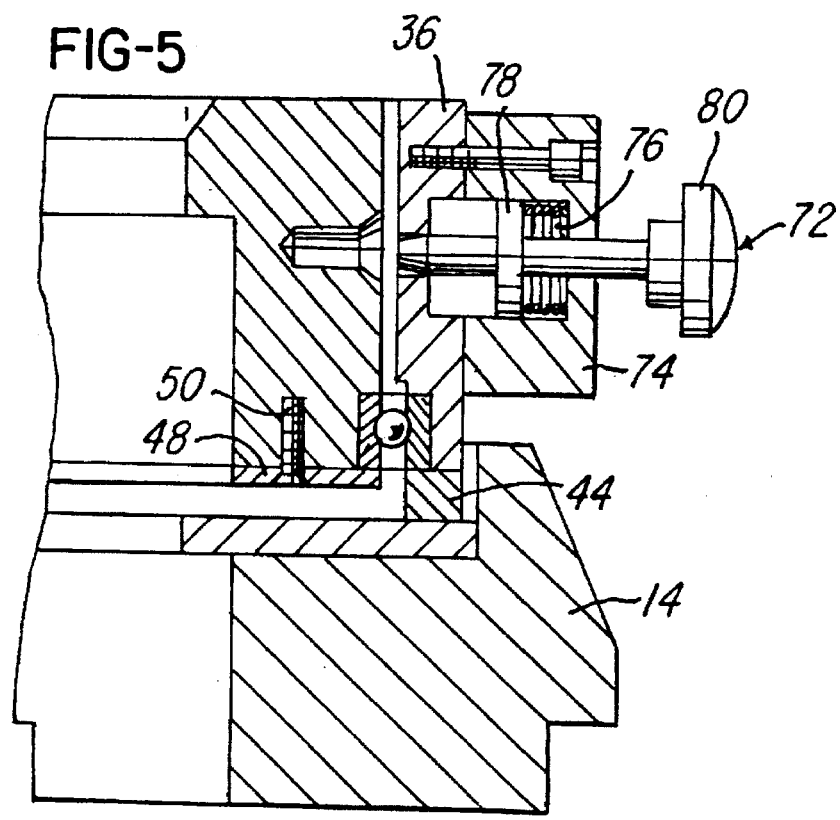
FIG. 5 is a fragmentary cross-sectional view similar to FIG. 4 and showing the same parts as FIG. 4, but at a different time in the operation thereof.

An alternative embodiment of the arrangement is illustrated in FIGS. 4 and 5. Here, the stator support nest 32 is provided with a locking hole 70 which is adapted to receive a spring-biased shot pin 72 movable in a shot pin housing 74 mounted on the outer wall of the bearing housing 36. In FIG. 4, the shot pin 72 is shown biased into the locking hole 70 by a spring 76 acting against a enlarged diameter stop portion 78 of the shot pin 72. In operation, to enable rotation of the nest 32 with the locking arrangement of FIG. 4, the shot pin 72 is provided with a handle 80 by which the operator may pull the shot pin 72 out of the hole 70 into the housing 74 as shown in FIG. 5. Of course, it will be understood that there will be more than one locking hole 70 vertically aligned with the shot pin 72 so that the nest 32 may be locked in various different rotary positions. As before, it is presently contemplated that there will be four equally-spaced locking holes 70. Because of the positive restraint against rotation provided when the shot pin 72 enters a locking hole 70, only one shot pin 72 need be provided.

Although the presently preferred embodiments of this invention have been described, it will be understood that within the purview of the invention various changes may be made within the scope of the following claims.

Having thus described my invention, I claim:

1. A stator support assembly for use during the manufacture of electric motor stator assemblies, comprising:
   a pallet;
   a stator support nest rotatably mounted on said pallet, said nest having generally horizontal, upwardly-facing, stator core supporting surfaces and generally vertical stator core confining wall portions; and
   a lock mechanism comprising a first part on said nest and a second part fixed in relation to said nest that cooperate to resist rotation of said nest.

2. The stator support assembly of claim 1 wherein said nest is rotatably mounted on said pallet by a bearing assembly comprising a bearing housing fixed to said pallet and having a circular through bore within which said nest is rotatably received, and a circular ball bearing having an outer race retained on said bearing housing and an inner race retained on said nest.

3. The stator support assembly of claim 2 wherein said first part of said lock mechanism comprises a recess in the outer surface of said nest, and said second part of said lock mechanism comprises a detent element mounted on said bearing housing in vertical alignment with said recess and biased toward the outer surface of said nest.

4. The stator support assembly of claim 3 wherein said lock mechanism comprises plural recesses in the outer surface of said nest and plural detent elements mounted on said bearing housing in vertical alignment with said recesses and biased toward the outer surface of said nest.

5. The stator support assembly of claim 4 wherein there are four said recesses equally spaced about the periphery of said nest and four said detent elements equally spaced about the periphery of said nest.

6. The stator support assembly of claim 2 wherein said first part of said lock mechanism comprises a hole in the outer surface of said nest, and said second part of said lock mechanism comprises a spring-biased shot pin slidably mounted on said bearing housing in vertical alignment with said recess.

7. The stator support assembly of claim 6 wherein said lock mechanism comprises plural holes in the outer surface of said nest, each being in vertical alignment with said shot pin.

8. The stator support assembly of claim 7 wherein there are four said holes equally spaced about the periphery of said nest.

9. The stator support assembly of claim 2 wherein said outer race is clamped to said bearing housing by an outer race retainer fixedly mounted on said support plate and said inner race is affixed to said nest by an inner race retainer clamped to said nest.

10. The stator support assembly of claim 9 wherein said first part of said lock mechanism comprises a recess in the outer surface of said nest and said second part of said lock mechanism comprises a detent element mounted on said bearing housing in vertical alignment with said recess and biased toward the outer surface of said nest.

11. The stator support assembly of claim 10 wherein said lock mechanism comprises plural recesses in the outer surface of said nest and plural detent elements mounted on said biased housing in vertical alignment with said resesses and biased toward the outer surface of said nest.

12. The stator support assembly of claim 11 wherein there are four said recesses equally spaced about the periphery of said nest and four said detent elements equally spaced about the periphery of said nest.

13. The stator support assembly of claim 9 wherein said first part of said lock mechanism comprises a hole in the outer surface of said nest, and said second part of said lock mechanism comprises a spring-biased shot pin slidably mounted on said bearing housing in vertical alignment with said recess.

14. The stator support assembly of claim 13 wherein said lock mechanism comprises plural holes in the outer surface of said nest, each being in vertical alignment with said shot pin.

15. The stator support assembly of claim 14 wherein there are four said holes equally spaced about the periphery of said nest.

* * * * *